United States Patent [19]

Ikeda et al.

[11] 3,979,246
[45] Sept. 7, 1976

[54] HEAT-INSULATED EXHAUST PIPE

[75] Inventors: Koichi Ikeda; Hideo Ikeda, both of Yokohama, Japan

[73] Assignee: Nissan Motor Co., Ltd., Yokohama, Japan

[22] Filed: Mar. 4, 1974

[21] Appl. No.: 447,741

[30] Foreign Application Priority Data

Mar. 5, 1973  Japan.................. 48-25918

[52] U.S. Cl............................... 156/187; 156/215; 156/319; 427/179
[51] Int. Cl.².................................. B65H 81/00
[58] Field of Search.................. 138/149, DIG. 2; 156/187, 185, 62.6, 319; 117/126 AF, 126 GF; 106/104; 161/205; 427/179

[56] References Cited
UNITED STATES PATENTS

| | | |
|---|---|---|
| 740,131 | 9/1903 | Heany............................ 156/185 X |
| 967,360 | 8/1910 | Funke............................ 138/149 X |
| 1,470,723 | 10/1923 | Gillies........................... 161/205 X |
| 2,009,619 | 7/1935 | Huffine.......................... 156/185 X |
| 2,019,417 | 10/1935 | King.............................. 156/62.6 |
| 3,259,536 | 7/1966 | Gaeth et al................. 117/126 GF X |
| 3,769,072 | 10/1973 | Echerd et al................ 117/126 AF |
| 3,835,054 | 9/1974 | Olewinski et al........... 252/313 S X |

*Primary Examiner*—David A. Simmons

[57] ABSTRACT

A metal tube covered with a flexible and porous heat insulator is immersed in a processing liquid comprising a silica-containing salt and water followed by drying. The insulator is stiffened and clings to the tube, so that strength, durability and heat resistance is improved, and clamping is facilitated.

1 Claim, 5 Drawing Figures

HEAT-INSULATED EXHAUST PIPE

The present invention relates to exhaust pipes for motor vehicles, and more particularly to an pipe covered with a heat insulator and a production method thereof.

Various means to control the composition of exhaust gas from internal-combustion engines of motor vehicles have been proposed to meet current requirements for prevention of air pollution, and an example of them is a method of making the exhaust innoxious by reactions with suitable catalytic substances. In such method, the exhaust gas is usually required to be kept at considerably high temperatures within a predetermined range in order to allow the reaction to proceed adequately. Accordingly, there has been a keen demand for an exhaust pipe of excellent heat-insulating property which allows the exhaust to be conducted from the combustion chamber of an engine to a reaction chamber with little temperature drop by the effect of ambient temperature.

From another viewpoint, the surface temperature of an exhaust pipe is desired to be as low as possible because a high temperature of the pipe, which is usually installed under and close to a vehicle floor, causes the floor to be heated, possibly resulting in passengers' displeasure and burning of nearby inflamable elements. Exhaust pipes, therefore, should have heat-insulating property.

To meet these requirements, some of conventional exhaust pipes for motor vehicles are covered with heat insulators in various manners. For example, a sheet or belt of an insulating material such as asbestos is wrapped around a metal tube and is fixed to the tube with wire and/or adhesive tape, or a tube is sheathed with a sleeve made of a similar material. However, these types of insulators are unsatisfactory for their poor water and abrasion resistance and durability. Such drawbacks can be overcome by applying a thin aluminum film on an insulator sheet surface by, for example, vapor deposition prior to forming process, but there remains the problem of tedious and costly work called for by forming the film-applied sheet and covering a tube which is in many cases somewhat curved.

It is therefore an object of the invention to provide a strong and durable heat-insulated pipe for conducting a fluid and a simple and inexpensive method of making such pipe.

There is provided, according to the invention, a pipe to conduct a fluid comprising a metal tube and a tubular insulator of a flexible and porous heat-insulating material covering and clinging to the outside of the tube, the tubular insulator being impregnated with a stiffening agent comprising a silica-containing salt. In another aspect of the invention, a method of making a pipe of the invention comprises the steps of covering a metal tube with a flexible and porous heat-insulating material, immersing the covered tube in a processing liquid comprising a silica-containing salt and water, and drying the covered tube after removal from the liquid to make the covering insulator stiffen and cling to the outside of the tube.

Features and advantages of the invention will be understood from the following description taken in connection with the accompanying drawings, in which.

Figure 1:
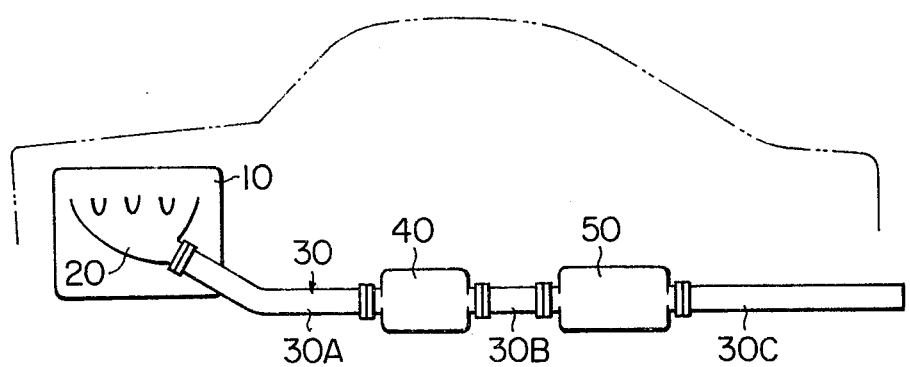
FIG. 1 is a schematic side view of an example of exhaust systems for motor vehicles.

Referring to FIG. 1, an example of automobile exhaust systems aiming at a clean exhaust gas essentially consists of an exhaust manifold 20 of an internal-combustion engine 10 and exhaust pipe 30, which is divided into three tubes, namely, a front tube 30A, center tube 30B and tail tube 30C to interpose a catalyst chamber 40 and muffler 50 in series as shown in FIG. 1.

A pipe of the present invention is most suitable to the front tube 30A which connects the exhaust manifold 20 with the catalyst chamber 40, but may be used to the remainder tubes 30B, 30C. It will become apparent from the description hereinafter that a tube provided with an insulator of the invention can be used for conducting various fluids other than exhaust gas when heat insulation is desired.

Figure 2:
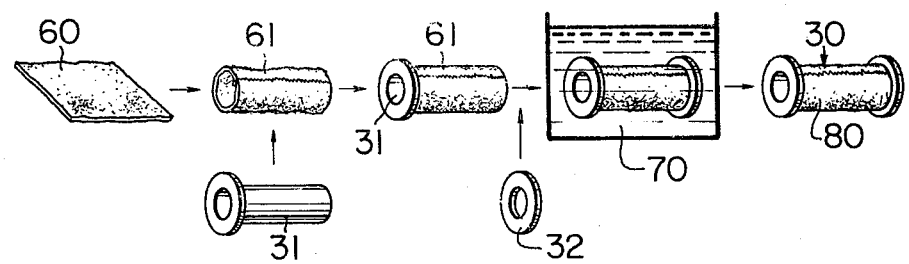
FIG. 2 is a flow sheet of a method of the invention.
Figure 5:
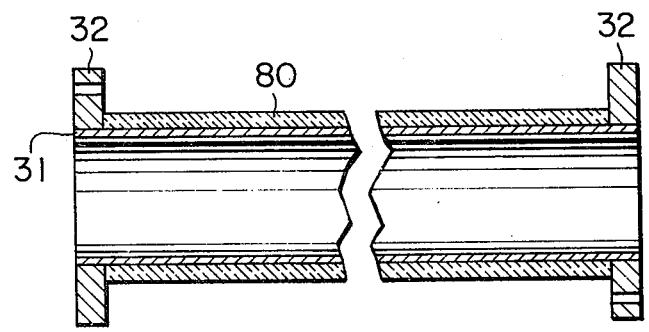
FIG. 5 is a longitudinal sectional view of a pipe of the invention.

In a first embodiment of the method of the invention shown in FIG. 2, a flexible and porous heat-insulating material sheet 60, for example, of asbestos, is sewed to form a sleeve 61 corresponding to the size of a metal tube 31, and the sleeve 61 is jacketed around the tube 31. The tube 31 covered with the asbestos sleeve 61 is immersed in a processing liquid 70 so that the sleeve 61 is thoroughly soaked with the liquid 70. The processing liquid 70 is an aqueous solution or a colloidal dispersion comprising water and at least a silica-containing inorganic salt such as, for example, sodium silicate. Then the tube 31-sleeve 61 assembly is removed from the liquid 70 followed by drying at room temperature or at moderately raised temperatures. After drying, the sleeve 61 stiffens and clings to the outside of the tube 31. Thus produced heat-insulated pipe 30 of FIG. 5 is surprisingly improved in water and abrasion resistance and durability compared with conventional sheathes of untreated insulating materials. Clinging of the tubular insulator 80 to the tube 31 facilitates clamping of the work. If the insulated pipe 30 is required to have flanges 32 at both ends, one of them is attached to the tube 31 either prior to the immersion step or after drying.

Figure 3:
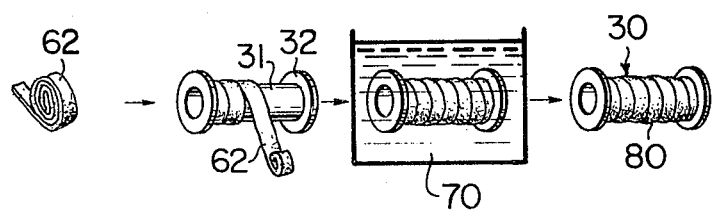
FIGS. 3 and 4 are similar flow sheets but illustrate modifications of the step of covering a tube.
Figure 4:
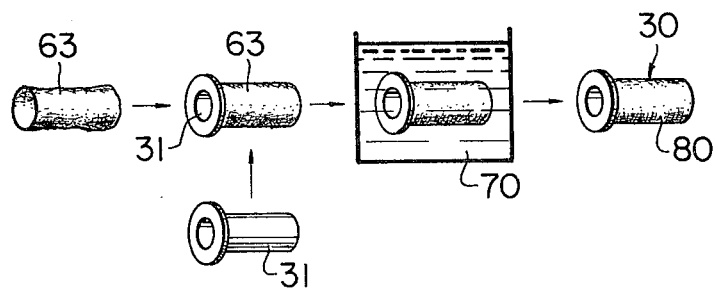

Covering of the tube 31 with an insulating material may be accomplished in various ways. In a modified embodiment shown in FIG. 3, a heat insulator belt 62 is directly wrapped around the tube 31; and FIG. 4 shows another modification, wherein an insulating tube 63 made of tightly woven yarn of a heat insulating material is employed. The both modifications are especially suitable to curved tubes 31, and the belt-wrapping of FIG. 3 makes it possible to complete the flange 32 attachment work prior to the insulation process. It will be apparent that stiffening and clinging to the tube 31 of the insulator 62, 63 need little modification from the above embodiment of FIG. 2, and that the obtained pipes 30 have a similar characteristic.

The following examples are presented to further illustrate the invention and not by way of limitation.

EXAMPLE 1

A stainless steel tube covered with an asbestos sleeve about 3 mm in thickness was immersed in an aqueous solution of a silica complex salt with sodium oxide in a composition lying in the range commonly called water glass. After removal from the solution, the tube-sleeve assembly was dried at room temperature until the impregnated silica salt was solidified and the sleeve became stiff.

EXAMPLE 2

A stainless steel tube was wrapped with about 3 mm thick asbestos belt, and then immersed in a processing liquid which was a colloidal dispersion of the following mixture in water:

| | |
|---|---|
| amorphous silica gel | about 45 parts by weight |
| alumina | about 25 parts by weight |
| organic polymer | about 10 parts by weight |
| pigment | about 5 parts by weight |

Drying was carried out at about 120°C.

In addition to a remarkable improvement in strength and water resistance, the insulated exhaust pipe of the invention is highly heat resistant, so that it can be used at temperatures up to about 800°C. Furthermore, the simple procedures in the method of the invention bring about an increased productivity and resulting reduction in production costs.

What is claimed is:

1. A method of making a heat-insulated pipe for use in an exhaust line of an automobile internal combustion engine, comprising the steps of:
    covering the outer surface of a stainless steel tube with an asbestos sheet;
    immersing the covered tube in a processing liquid, said processing liquid being a colloidal dispersion in water of a mixture comprising about 45 parts by weight of amorphous silica gel, about 25 parts by weight of alumina and about 10 parts by weight of an organic polymer; and
    drying the covered tube after removal from said processing liquid at a temperature of about 120°C thereby to make the asbestos sheet stiffen and cling to the outer surface of the tube.

* * * * *